United States Patent
Kikuchi

(10) Patent No.: US 9,152,367 B2
(45) Date of Patent: Oct. 6, 2015

(54) PRINTING APPARATUS, CONTROL METHOD THEREOF, AND STORAGE MEDIUM

(71) Applicant: CANON KABUSHIKI KAISHA, Tokyo (JP)

(72) Inventor: Shou Kikuchi, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/027,100

(22) Filed: Sep. 13, 2013

(65) Prior Publication Data
US 2014/0078548 A1 Mar. 20, 2014

(30) Foreign Application Priority Data

Sep. 20, 2012 (JP) .................................. 2012-207527

(51) Int. Cl.
*G06F 15/00* (2006.01)
*G06F 3/12* (2006.01)
*G06K 15/02* (2006.01)

(52) U.S. Cl.
CPC ............ *G06F 3/1296* (2013.01); *G06F 3/1203* (2013.01); *G06F 3/1211* (2013.01); *G06F 3/1262* (2013.01); *G06F 3/1263* (2013.01); *G06F 3/1285* (2013.01); *G06K 15/1809* (2013.01); *G06F 3/1264* (2013.01)

(58) Field of Classification Search
None
See application file for complete search history.

(56) References Cited

U.S. PATENT DOCUMENTS

| | | | |
|---|---|---|---|
| 2007/0171455 A1* | 7/2007 | Tominaga | 358/1.14 |
| 2010/0265530 A1* | 10/2010 | Takechi | 358/1.14 |
| 2010/0271656 A1* | 10/2010 | Morales et al. | 358/1.15 |
| 2011/0052241 A1* | 3/2011 | Kurohata | 399/81 |
| 2011/0075202 A1* | 3/2011 | Shirai | 358/1.15 |
| 2012/0206763 A1* | 8/2012 | Yoshida | 358/1.15 |
| 2012/0236351 A1* | 9/2012 | Arima | 358/1.13 |
| 2013/0004195 A1* | 1/2013 | Kohda | 399/82 |

FOREIGN PATENT DOCUMENTS

JP  2006-150732 A  6/2006

* cited by examiner

*Primary Examiner* — Helen Q Zong
(74) *Attorney, Agent, or Firm* — Fitzpatrick, Cella, Harper & Scinto

(57) ABSTRACT

When a printing apparatus according to one aspect of this invention newly accepts a print job other than a specific job, for which guarantee of the print order is set as a print setting, during execution of print order guarantee for inhibiting execution of a print job other than the specific job and executing specific jobs in the acceptance order, it executes interrupt print processing to execute the print job under a predetermined condition. If the print settings of the print job do not include a setting which disturbs output of a printed material complying with the print settings of a specific job in progress by the print order guarantee, the printing apparatus executes the print job by interrupt processing.

7 Claims, 16 Drawing Sheets

PRINTING APPARATUS, CONTROL METHOD THEREOF, AND STORAGE MEDIUM

BACKGROUND OF THE INVENTION

1. Field of the Invention

The present invention relates to a printing apparatus, control method thereof, and storage medium.

2. Description of the Related Art

When a printing apparatus continuously executes a plurality of print jobs, the time taken for reception processing generally varies between the respective print jobs depending on the data size of a print job received via a network. When the printing apparatus starts reception processing for the first print job of a large data size and then starts reception processing for the second print job of a small data size, the jobs may be executed in an order different from the one in which the reception processes have started. More specifically, if the reception processing for the second print job that has started later is completed before the completion of the reception processing for the first print job that has started first, the execution of the second print job may start before the first print job. In this manner, depending on the data size of a received print job, the printing apparatus does not always execute print jobs in an order in which the user input them to the printing apparatus.

However, it is known that the user of a production printing apparatus or the like has the following request. For example, for a print job which is executed by dividing it into a plurality of jobs in order to print a form, DM, or the like, it is desirable for the user to execute print jobs in an order in which he input them to the printing apparatus (that is, an external apparatus transmitted them to the printing apparatus). This is because the user wants to handle, as a series of products, a plurality of printed materials obtained as a result of executing a plurality of such print jobs.

As a technique for meeting this user demand, there is proposed a print order guarantee technique of, when the printing apparatus accepts a plurality of print jobs, guaranteeing the execution of them in an order in which the print jobs were accepted. For example, when the printing apparatus accepts a print job (to be referred to as a "print order guarantee job" hereinafter) for which the execution of print order guarantee is designated, it inhibits interruption by another job for which the execution of print order guarantee is not designated, and executes only the print order guarantee job. If the printing apparatus newly accepts a print order guarantee job in a predetermined period, it inhibits interruption by a job other than the print order guarantee job in a predetermined period further from that time. The printing apparatus repeats this operation, handles a plurality of accepted print order guarantee jobs as a job group, and executes the plurality of jobs included in the job group in the acceptance order. In this way, the printing apparatus implements the print order guarantee.

As described above, when executing the print order guarantee, the printing apparatus executes, in the acceptance order, a plurality of print order guarantee jobs accepted in a predetermined period. In this case, the printing apparatus inhibits the execution of a print job other than the print order guarantee jobs till the completion of the series of print order guarantee jobs. However, if the execution of another print job is inhibited without exception, the start of execution of another execution-inhibited job may be delayed more than necessary. Further, when print order guarantee jobs each having a relatively small data size and short execution time are executed at a given time interval, even if an idle time during which no job is executed is generated, no other job can be executed by using the idle time while the print order guarantee continues. In this case, the operation of the printing apparatus stops intermittently, greatly decreasing the productivity.

It is therefore desirable to execute another print job by interruption as much as possible during the execution of print order guarantee for a plurality of print jobs. Japanese Patent Laid-Open No. 2006-150732 discloses a method of, when a highest-priority job is different from a job in progress, temporarily stopping the job in progress and starting the execution of the highest-priority job. By using this method, for example, it is conceivable to execute a higher-priority print job by interruption during the execution of print order guarantee.

However, the conventional technique as described above has the following problems. When print jobs are executed by the above-described print order guarantee, if another print job is executed by interruption, this may influence the output order of a plurality of printed materials output by the print order guarantee. For example, if a printed material output by another print job is mixed in a plurality of printed materials output by the print order guarantee, the printed materials may not be output to the discharge destination in an output order intended by the user. Also, when the execution of a print job in progress is stopped, as described in Japanese Patent Laid-Open No. 2006-150732, the productivity may decrease owing to the time taken to switch the print job.

SUMMARY OF THE INVENTION

The present invention has been made to solve the above-described problems. The present invention provides a technique of increasing the productivity of a printing apparatus by allowing, during the execution of print order guarantee, the execution of a print job other than a specific print job for which the execution of print order guarantee is set, without disturbing the execution of the specific print job.

According to one aspect of the present invention, there is provided a printing apparatus comprising: an acceptance unit configured to accept a print job; a determination unit configured to, when the acceptance unit newly accepts a print job other than a specific job, for which guarantee of a print order is set as a print setting, during execution of print order guarantee for inhibiting execution of a print job other than the specific job and executing a plurality of specific jobs in an acceptance order, determine whether print settings of the print job include a setting which disturbs output of a printed material complying with print settings of a specific job in progress by the print order guarantee; and a control unit configured to, when the determination unit determines that the print settings of the print job do not include the setting which disturbs output of the printed material complying with the print settings of the specific job in progress by the print order guarantee, execute the print job by interrupt processing during execution of the print order guarantee.

According to another aspect of the present invention, there is provided a method of controlling a printing apparatus, the method comprising the steps of: accepting a print job; when a print job other than a specific job, for which guarantee of a print order is set as a print setting, is newly accepted during execution of print order guarantee for inhibiting execution of a print job other than the specific job and executing a plurality of specific jobs in an acceptance order, determining whether print settings of the print job include a setting which disturbs output of a printed material complying with print settings of a specific job in progress by the print order guarantee; and when the print settings of the print job are determined not to include the setting which disturbs output of the printed material complying with the print settings of the specific job in progress by the print order guarantee, executing the print job by interrupt processing during execution of the print order guarantee.

According to still another aspect of the present invention, there is provided a computer-readable storage medium storing a computer program for causing a computer to execute steps of a method of controlling a printing apparatus, the method comprising the steps of: accepting a print job; when a print job other than a specific job, for which guarantee of a print order is set as a print setting, is newly accepted during execution of print order guarantee for inhibiting execution of a print job other than the specific job and executing a plurality of specific jobs in an acceptance order, determining whether print settings of the print job include a setting which disturbs output of a printed material complying with print settings of a specific job in progress by the print order guarantee; and when the print settings of the print job are determined not to include the setting which disturbs output of the printed material complying with the print settings of the specific job in progress by the print order guarantee, executing the print job by interrupt processing during execution of the print order guarantee.

The present invention can increase the productivity of a printing apparatus by allowing, during the execution of print order guarantee, the execution of a print job other than a specific print job for which the execution of print order guarantee is set, without disturbing the execution of the specific print job.

Further features of the present invention will become apparent from the following description of exemplary embodiments (with reference to the attached drawings).

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

<Printing System 100>

Figure 1:
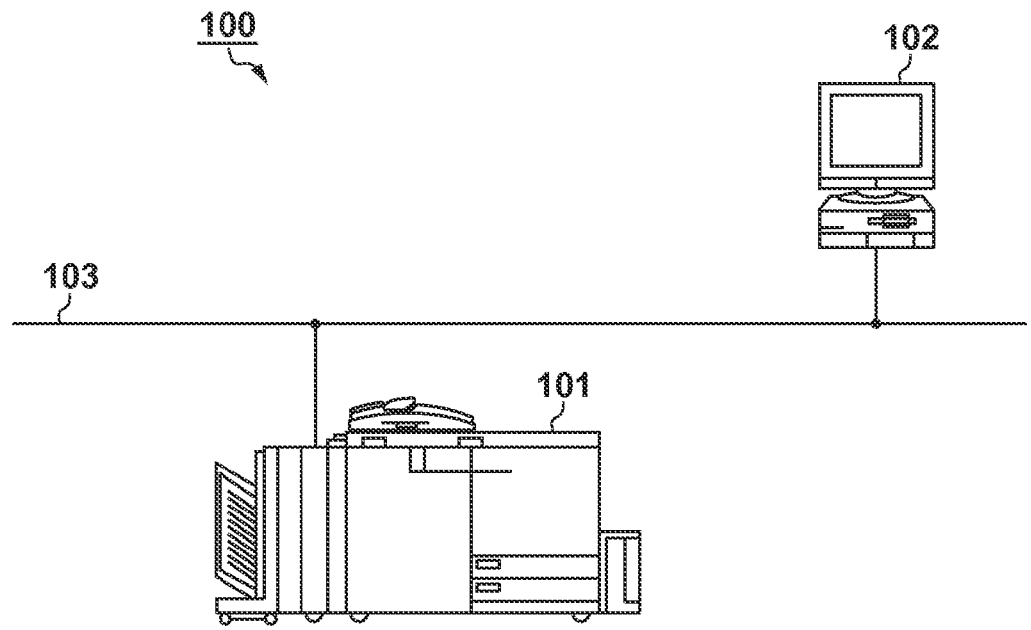
FIG. 1 is a view exemplifying the arrangement of a printing system 100.

A printing system to which embodiments to be described below are commonly applicable will be explained. FIG. 1 is a view exemplifying the arrangement of the printing system according to an embodiment of the present invention. A printing system 100 includes a printing apparatus 101 and client PC 102. The printing apparatus 101 and client PC 102 are connected to be communicable via a network 103 such as a LAN or WAN. The network 103 can be a wired or wireless network.

The printing apparatus 101 has various functions such as the scan (reading) function, print (printing) function, and copy (copying) function. The client PC 102 has functions of creating, editing, and deleting an application file, and issuing a print instruction to the printing apparatus 101 via the network 103. The user can use (operate) the client PC 102 to generate a print job for causing the printing apparatus 101 to print based on print data, and transmit the generated print job to the printing apparatus 101. The user can also confirm the status of a job and the like in the printing apparatus 101 via the display unit of the client PC 102.

<Hardware Arrangement of Printing Apparatus 101>

Figure 2:
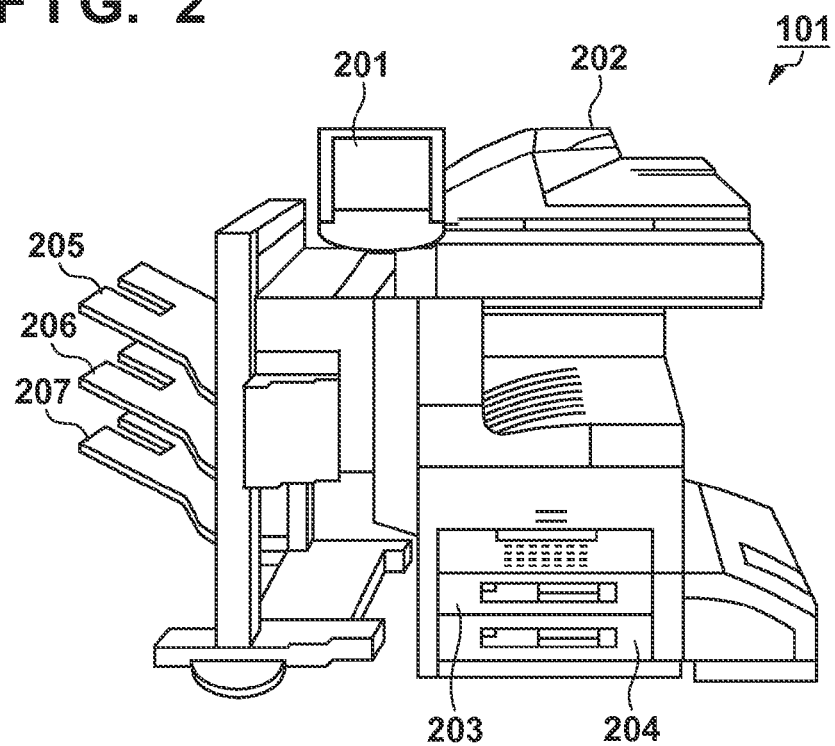
FIG. 2 is a view exemplifying the outer appearance of the printing apparatus 101.

FIG. 2 is a view exemplifying the outer appearance of the printing apparatus 101 according to the embodiment of the present invention. In embodiments to be described later, the printing apparatus 101 is an image forming apparatus such as a copying machine or multi-function peripheral (MFP). The printing apparatus 101 includes an operation unit 201, a scanner unit 202, a plurality of sheet feed units 203 and 204, and a plurality of sheet discharge units 205 to 207. Note that the printing apparatus 101 may be a single apparatus as shown in FIG. 2, or an apparatus configured by combining a plurality of apparatuses.

The operation unit 201 accepts input of various instructions by the user to the printing apparatus 101. The operation unit 201 includes hard keys, and a display unit such as a touch panel display. The scanner unit 202 reads (scans) an original to generate electronic data (image data) corresponding to the image of the original. Sheets (printing materials) to print an image in the printing apparatus 101 are stacked on the sheet feed units 203 and 204. By operating the client PC 102 or the operation unit 201 of the printing apparatus 101, the user can select (designate), for each job to be executed by the printing apparatus 101, which of the sheet feed units 203 and 204 supplies a printing sheet. Printed sheets are discharged to the sheet discharge units 205 to 207. By operating the client PC 102 or the operation unit 201 of the printing apparatus 101, the user can select (designate), for each job to be executed by the printing apparatus 101, which of the sheet discharge units 205 to 207 a printed sheet is discharged to.

<Control Arrangement of Printing Apparatus 101>

Figure 3:
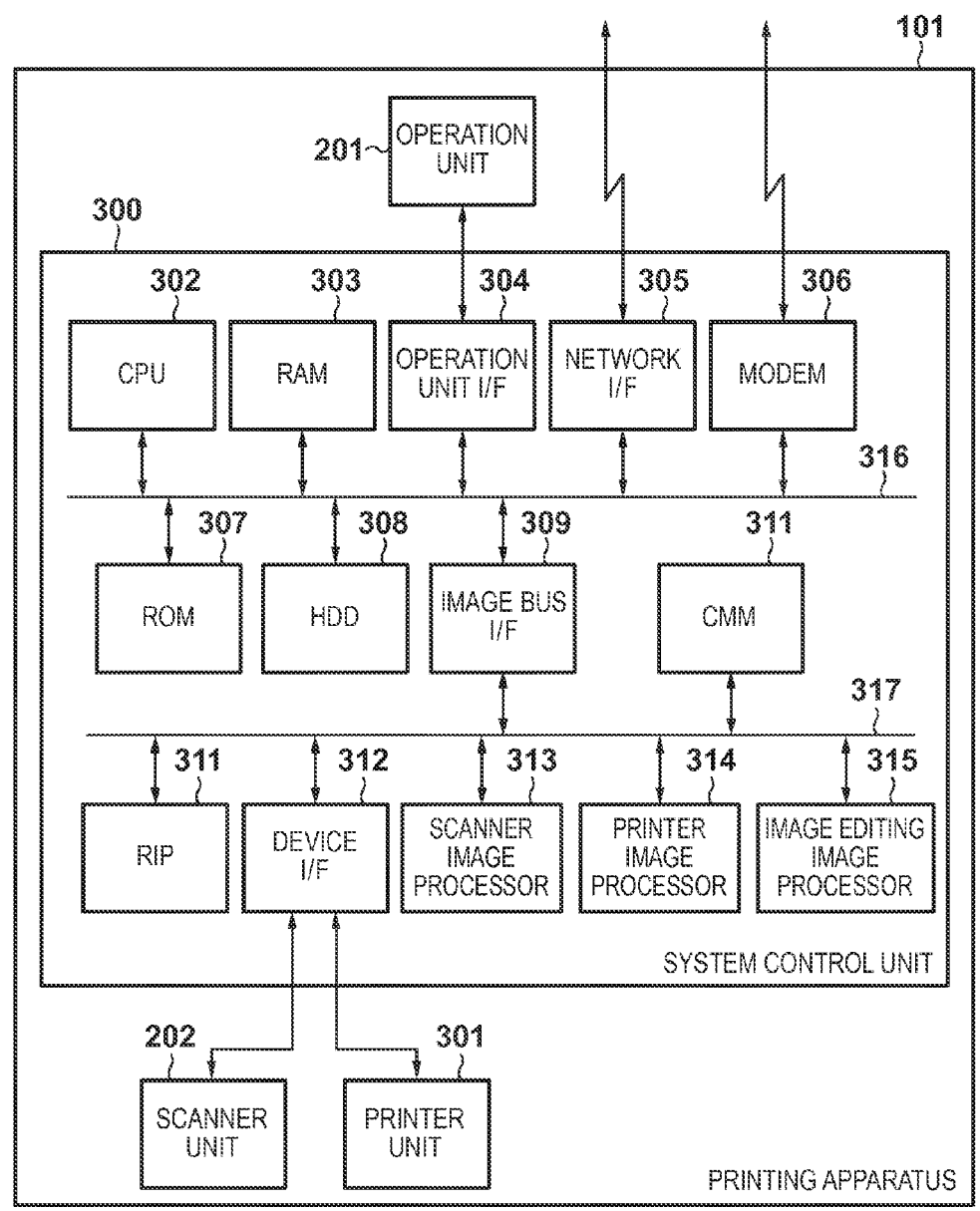
FIG. 3 is a block diagram exemplifying the control arrangement of the printing apparatus 101.

FIG. 3 is a block diagram exemplifying the control arrangement of the printing apparatus 101 according to the embodiment of the present invention. The printing apparatus 101 includes a system control unit 300. The operation unit 201, the scanner unit 202 serving as an image input device, and a printer unit 301 serving as an image output device are connected to the system control unit 300.

The system control unit 300 controls the scanner unit 202 and printer unit 301 to input image data from the scanner unit 202 and output (print out) image data to the printer unit 301. Also, the system control unit 300 controls the operation unit 201 to output (display and output) image data to the operation unit 201. The printing apparatus 101 is connectable not only to the network 103 but also to a telephone line. The system control unit 300 transmits/receives (inputs/outputs) various data to/from an external apparatus (for example, the client PC 102) via the network 103 or the telephone line.

The system control unit 300 includes a CPU 302, RAM 303, and operation unit interface (I/F) 304 as devices mutually connected via a system bus 316. The system control unit 300 includes a network I/F 305, modem 306, ROM 307, Hard Disk Drive (HDD) 308, and image bus I/F 309.

The CPU 302 is a central processing unit for controlling the overall printing apparatus 101. The RAM 303 functions as a system work memory for operating the CPU 302, and as an image memory for temporarily storing image data input via the scanner unit 202 or network I/F 305. The ROM 307 is a boot ROM which stores the boot program of the system. The HDD 308 stores various data such as system software for various processes, and input image data.

The operation unit I/F 304 is an interface for connecting the operation unit 201 and system control unit 300. The operation unit I/F 304 outputs screen data for displaying a screen such as an operation screen on the display unit of the operation unit 201, receives, from the operation unit 201, information (data) representing a user input accepted by the operation unit 201, and transfers the information to the CPU 302. The network I/F 305 is an interface which is formed from a LAN card or the like and connected to the network 103. The network I/F 305 transmits/receives data to/from an external apparatus communicable via the network 103. The modem 306 is connected to a telephone line, and transmits/receives data to/from an external apparatus communicable via the telephone line.

The image bus I/F 309 is an interface for connecting the system bus 316 and an image bus 317 capable of transferring image data at high speed, and is also a bus bridge for converting a data structure. The system control unit 300 includes a raster image processor (RIP) 311 and device I/F 312 as devices mutually connected via the image bus 317. The system control unit 300 further includes a scanner image processing unit 313, printer image processing unit 314, image editing image processing unit 315, and color management module (CMM) 310.

The RIP 311 rasterizes page description language (PDL) data into a raster image. The device I/F 312 is an interface between the scanner unit 202 and the printer unit 301, and performs synchronous/asynchronous conversion of image data transmitted/received between the scanner unit 202 and the printer unit 301.

The scanner image processing unit 313 performs image processes such as correction, processing, and editing for image data which has been output from the scanner unit 202 and input via the device I/F 312. The printer image processing unit 314 performs image processes such as correction and resolution conversion in accordance with the printing characteristics of the printer unit 301 for image data to be output to the printer unit 301. The image editing image processing unit 315 performs image processes such as rotation of image data and compression/decompression of image data.

The CMM 310 is a dedicated hardware module which performs color conversion processing (also called color space conversion processing) based on a profile or calibration data for image data. The profile used by the CMM 310 is information such as a function for converting multicolor image data expressed in a device-dependent color space into image data in a device-independent color space (for example, Lab). The calibration data used by the CMM 310 is data for correcting the color reproduction characteristics of the scanner unit 202 and printer unit 301.

<Software Module Arrangement of Printing Apparatus 101>

Figure 4:
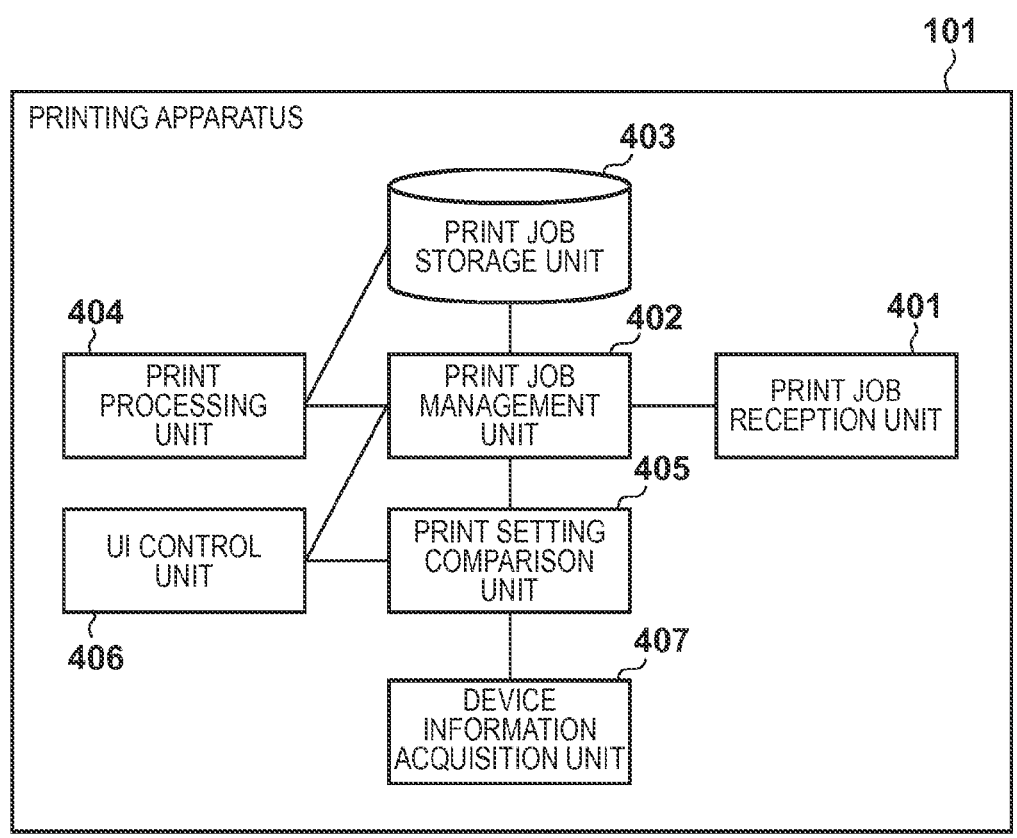
FIG. 4 is a block diagram exemplifying the software arrangement of the printing apparatus 101.

FIG. 4 is a block diagram exemplifying the software module arrangement of the printing apparatus 101. Software modules shown in FIG. 4 are stored as programs in the HDD 308. The CPU 302 implements the functions of the respective software modules shown in FIG. 4 in the printing apparatus 101 by loading the programs stored in the HDD 308 into the RAM 303 and executing them.

A print job reception unit 401 receives a print job transmitted from the client PC 102, and transfers the received print job to a print job management unit 402. The print job management unit 402 performs control regarding a print job for the execution order of print jobs, the start of printing, save of a print job, and the like. A print job storage unit 403 is used to temporarily save a print job which has been transmitted from the client PC 102 and received by the print job reception unit 401. In the embodiment described in this specification, the print job storage unit 403 corresponds to the HDD 308 or RAM 303. That is, when data is stored in the print job storage unit 403, it is stored in the HDD 308 or RAM 303 in fact.

A print processing unit 404 acquires a designated print job from the print job storage unit 403 in accordance with an instruction from the print job management unit 402, and performs rasterization processing, image processing, and the like for image data for printing (print data) contained in the acquired print job. Further, the print processing unit 404 transmits image data for printing to the printer unit 301 via the device I/F 312, and instructs the printer unit 301 to execute printing.

In accordance with an instruction from the print job management unit 402, a print setting comparison unit 405 compares, between print jobs, print settings such as the feed source (sheet feed unit), discharge destination (discharge unit), and post-processing which are designated in different print jobs, and outputs the comparison result. A UI control unit 406 generates screen data for mainly displaying a screen on the display unit (liquid crystal panel) of the operation unit 201, and performs display control to update the display screen in accordance with an input via the touch panel of the operation unit 201. When an input obtained via the touch panel of the operation unit 201 is equivalent to an execution instruction for a given job, the UI control unit 406 transfers the instruction to the print job management unit 402. A device information acquisition unit 407 acquires, from respective devices related to printing, such as the printer unit 301, sheet feed units 203 and 204, and sheet discharge units 205 to 207, information representing the states or use statues of the devices.

The printing apparatus 101 can execute the above-described print order guarantee. In the following embodiments, the print order guarantee means that the printing apparatus 101 inhibits the execution of a print job other than a print job (specific job) for which the guarantee of the printing order is set as a print setting, and executes a plurality of specific jobs in the acceptance order. (The "specific job" will also be called a "print order guarantee job", and the "print job other than the specific job" will also be called a "non-print order guarantee job".) Upon accepting a print order guarantee job, the printing apparatus 101 starts the execution of print order guarantee. More specifically, the printing apparatus 101 inhibits the execution (interruption) of a non-print order guarantee job for a predetermined period from the time when the print order guarantee job was accepted. If the printing apparatus 101 newly accepts a print order guarantee job in the predetermined period, it further inhibits the execution of a non-print order guarantee job in the predetermined period starting from that time. The printing apparatus 101 continues the print order guarantee as long as it accepts a print order guarantee job in the predetermined period. When the predetermined period has elapsed in a state in which no print order guarantee job is accepted, the printing apparatus 101 ends the print order guarantee.

On the premise of the above description, the first to sixth embodiments of the present invention will be explained. For descriptive convenience, the same reference numerals denote components or processing steps common between the embodiments, and a repetitive description thereof will be omitted as much as possible. Although the first to sixth embodiments can be practiced individually, one or more of them can also be practiced in combination.

First Embodiment

Figure 6:
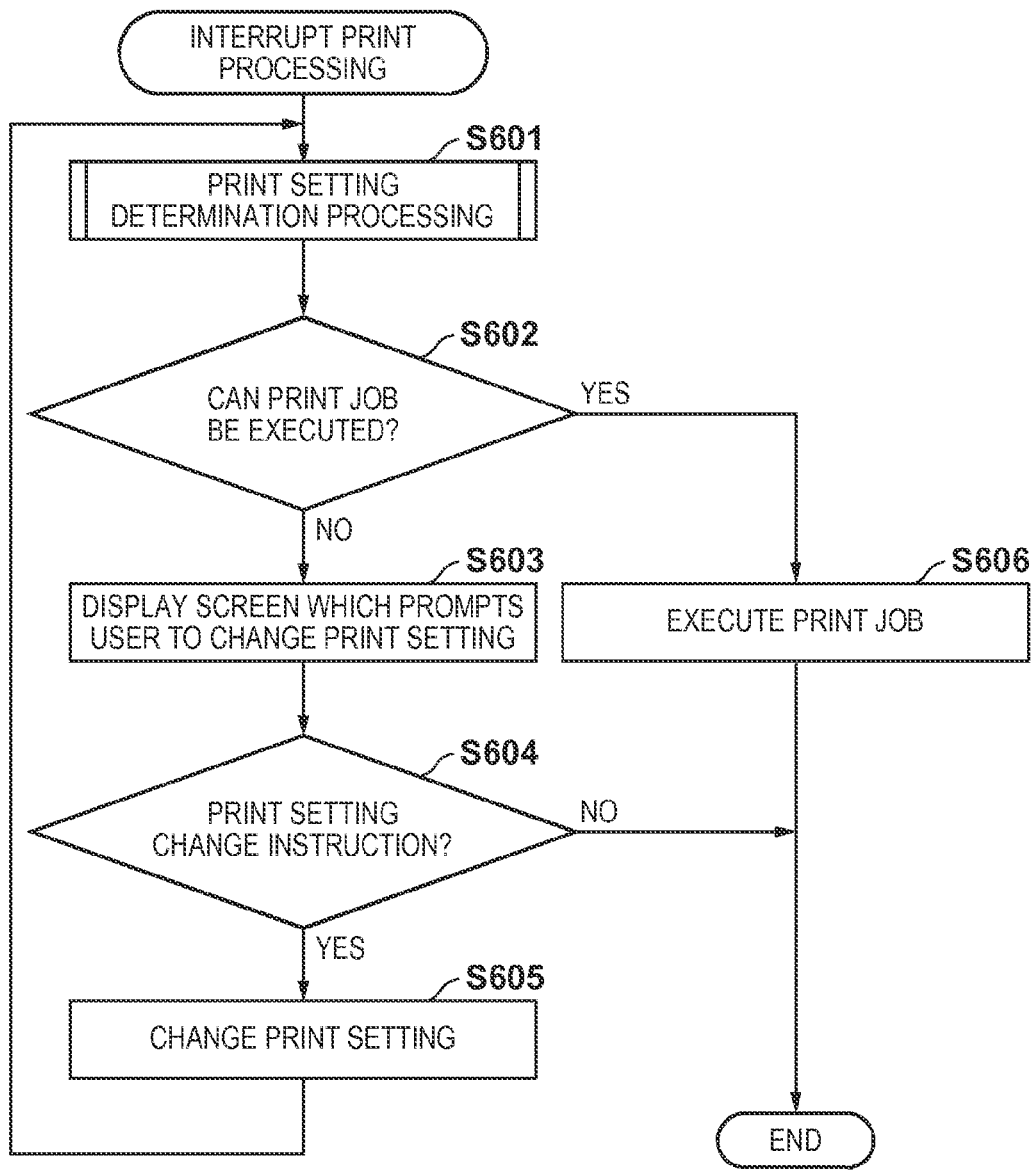
FIG. 6 is a flowchart showing details of the procedures of interrupt print processing (step S502) according to the first embodiment.
Figure 7:
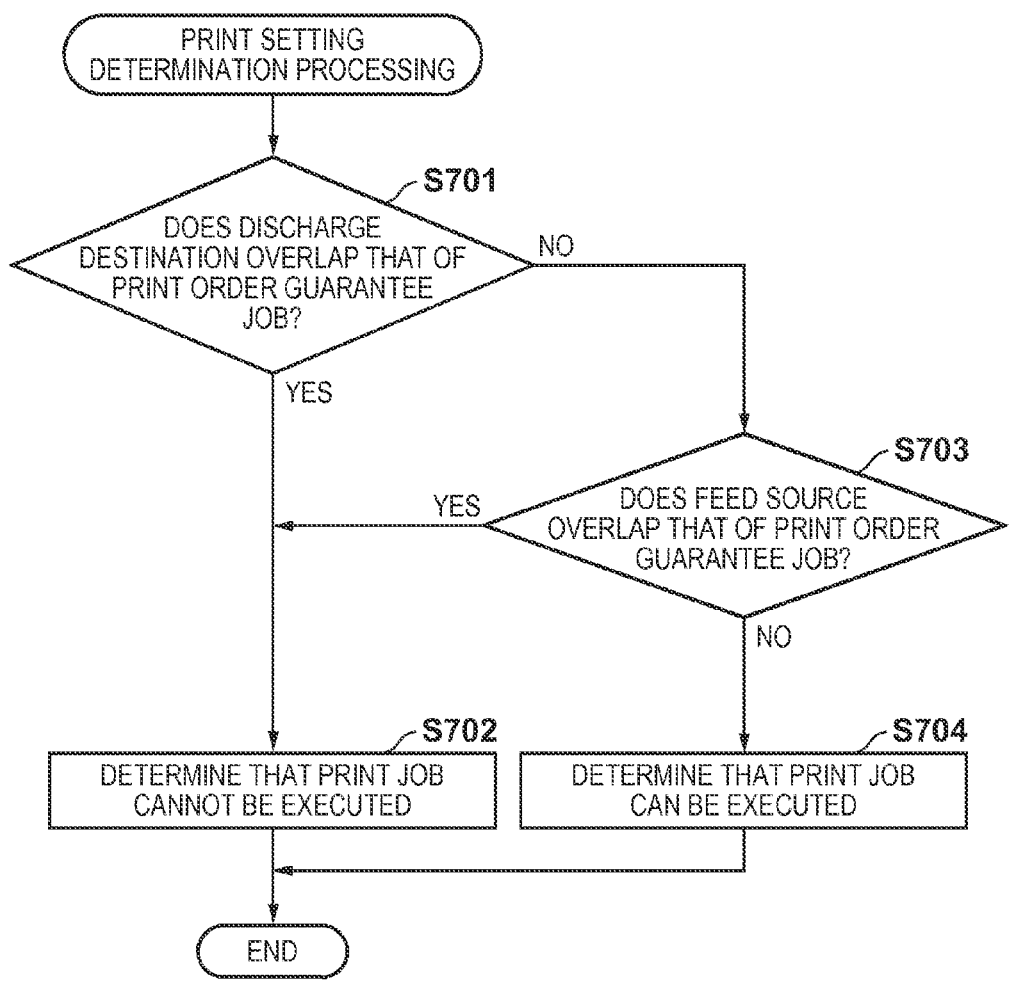
FIG. 7 is a flowchart showing details of the procedures of print setting determination processing (step S601) according to the first embodiment.

On the premise of a printing system 100 and printing apparatus 101 as described above, the first embodiment of the present invention will be described with reference to FIGS. 5 to 8. Processes in the respective steps of flowcharts shown in FIGS. 5 to 7 are executed in the printing apparatus 101 as the functions of the respective software modules shown in FIG. 4 by loading programs stored in an HDD 308 into a RAM 303 and executing them by a CPU 302.

Figure 5:
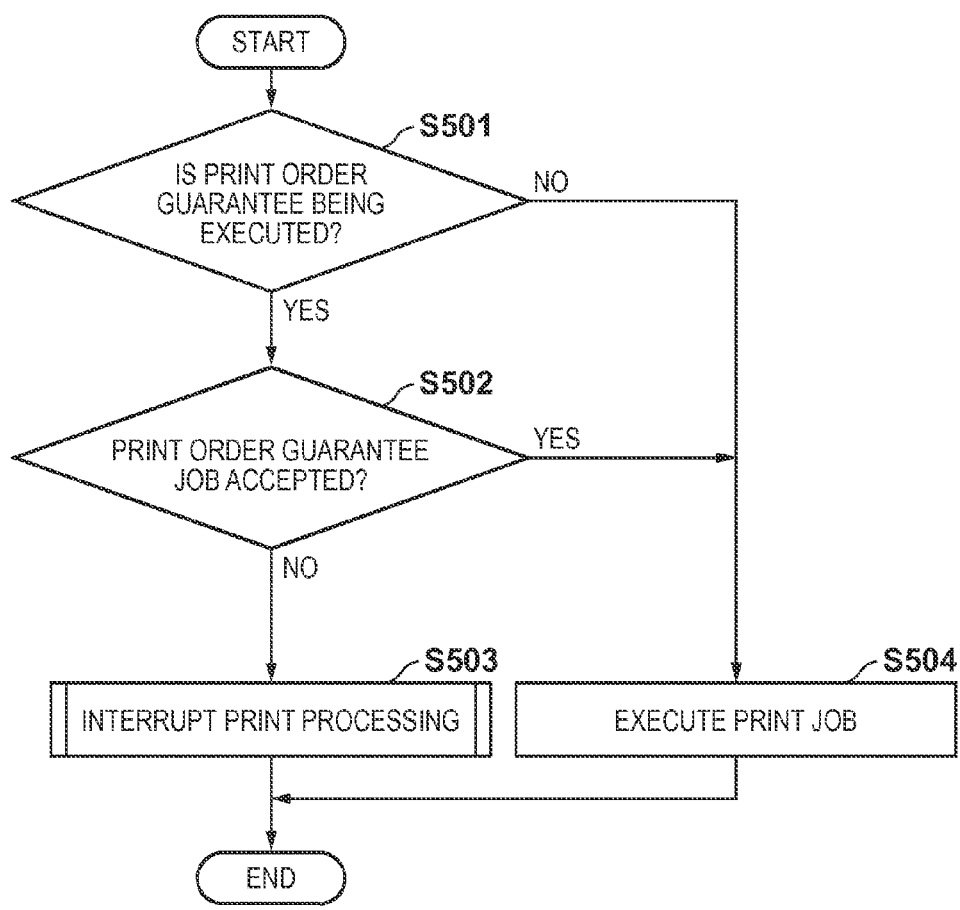
FIG. 5 is a flowchart showing the procedures of processing to be executed when a printing apparatus 101 accepts a print job according to the first embodiment.

FIG. 5 is a flowchart showing the procedures of processing to be executed when the printing apparatus 101 accepts a print job according to the first embodiment. In step S501, when a print job management unit 402 accepts a print job via a print job reception unit 401, it determines whether the print order guarantee is being executed. If the print job management unit 402 determines that the print order guarantee is not being executed, it advances the process to step S504, instructs a print processing unit 404 to execute a processing target print job, thereby causing it to execute the print job in a normal way. If the print job management unit 402 determines that the print order guarantee is being executed, it advances the process to step S502.

In step S502, the print job management unit 402 determines whether the print job accepted in step S501 is a print order guarantee job. If the print job management unit 402 determines that the accepted print job is a print order guarantee job, it advances the process to step S504. In step S504, the print job management unit 402 instructs the print processing unit 404 to execute the processing target print job (print order guarantee job), thereby causing it to execute the print job. If the print job management unit 402 determines in step S502 that the print job accepted in step S501 is not a print order guarantee job, it advances the process to step S503. In step S503, the print job management unit 402 executes interrupt print processing of executing a processing target print job under a predetermined condition in accordance with procedures shown in FIG. 6.

<Interrupt Print Processing>

FIG. 6 is a flowchart showing details of the procedures of the interrupt print processing in step S502. First, in step S601, the print job management unit 402 causes a print setting comparison unit 405 to compare the print settings of the print order guarantee job (specific job) in progress with those of the processing target print job (non-print order guarantee job) that has been accepted in step S501. Further, the print job management unit 402 causes the print setting comparison unit 405 to execute determination processing based on the comparison result.

More specifically, the print setting comparison unit 405 determines whether the print settings of the processing target print job include a setting which disturbs output of a printed material complying with the print settings of the print order guarantee job in progress by the print order guarantee. If the print setting comparison unit 405 determines that the print settings of the processing target print job include a setting which disturbs output of a printed material complying with the print settings of the print order guarantee job, it generates determination information representing that the processing target print job cannot be executed. If the print setting comparison unit 405 determines that the print settings of the processing target print job do not include a setting which disturbs output of a printed material complying with the print settings of the print order guarantee job, it generates determination information representing that the processing target print job can be executed. Further, the print setting comparison unit 405 outputs the generated determination information to the print job management unit 402. Note that the print setting determination processing in step S601 can be executed in accordance with, for example, procedures shown in FIG. 7 (to be described later).

Then, in step S602, the print job management unit 402 determines, based on the result of determination by the print setting comparison unit 405, whether the processing target print job (non-print order guarantee job) can be executed without influencing output of a printed material by the print order guarantee job in progress. If the print job management unit 402 determines that the processing target print job cannot be executed, it advances the process to step S603; if it determines that the processing target print job can be executed, to step S606.

In step S606, the print job management unit 402 (control unit) instructs the print processing unit 404 to execute the processing target print job, thereby executing the print job by interrupt processing during the execution of print order guarantee. The print processing unit 404 executes the processing target print job (non-print order guarantee job) by interrupt processing by executing the processing target print job before the start of execution of the next print order guarantee job upon completion of the print order guarantee job in progress. In this manner, while executing the print order guarantee, the processing target print job can be executed by interruption without influencing output of a printed material by the print order guarantee job.

Figure 8:
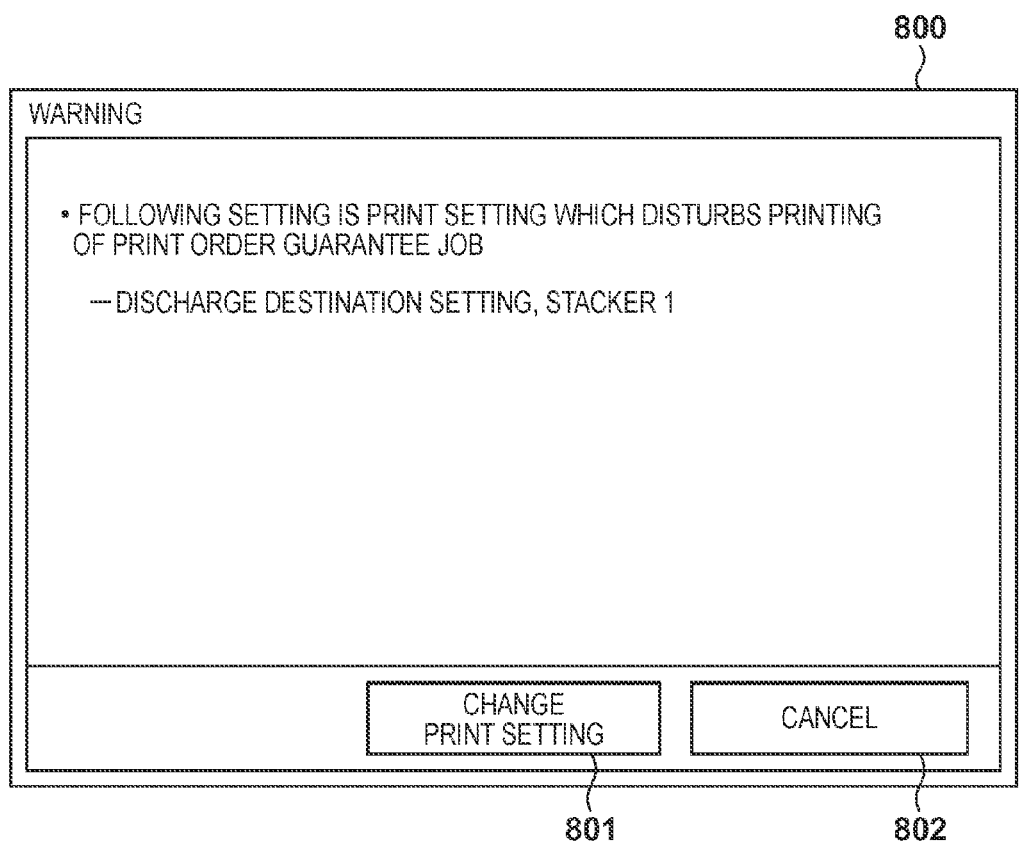
FIG. 8 is a view exemplifying a warning screen displayed on an operation unit 201 in step S603 according to the first embodiment.

In step S603, the print job management unit 402 instructs a UI control unit 406 about display of a warning screen (warning UI) on the display unit of an operation unit 201. In accordance with this instruction, the UI control unit 406 displays the warning screen on the display unit of the operation unit 201. FIG. 8 exemplifies the warning screen displayed on the operation unit 201 in step S603, and is equivalent to a change screen for changing the print settings of a print job. On a warning screen 800 displayed on the operation unit 201, the user selects to change the print settings of a processing target print job (non-print order guarantee job) and try the execution (interrupt processing) of the print job, or to wait for the completion of print order guarantee and execute the print job without changing the print settings. The UI control unit 406 transfers, to the print job management unit 402, the user instruction input via the operation unit 201. In step S604 to be described below, the print job management unit 402 determines, based on the information transferred from the UI control unit 406, whether to execute interrupt processing for the processing target print job.

In step S604, the print job management unit 402 determines whether a user change instruction to change the print setting of the processing target print job has been accepted via the operation unit 201. If the print job management unit 402 determines that no change instruction has been accepted (for example, when a cancel button 802 has been operated), it temporarily saves the processing target print job in a print job storage unit 403, and ends the process. In this case, the print job management unit 402 reads out the print job from the print job storage unit 403 and executes it after the completion of the execution of print order guarantee in progress (all print order guarantee jobs). If the print job management unit 402 determines in step S604 that the change instruction has been accepted (for example, when a change instruction button 801 has been operated), it advances the process to step S605.

In step S605, the print job management unit 402 changes the print setting of the processing target print job in accordance with a user instruction further input via the operation unit 201. Then, the print job management unit 402 returns the process to step S601 to repeat the above-described determination processing and change of print setting (steps S601 to S605). In steps S601 to S605, the print job management unit 402 tries interrupt processing for the processing target print job as long as the user inputs a print setting change instruction. If the changed print setting of the processing target print job is a setting which does not disturb output of a printed material complying with the print settings of the print order guarantee job in progress, the print job management unit 402 executes interrupt processing for the processing target print job. That is, the print job management unit 402 inserts the execution of the processing target print job (non-print order guarantee job) between the execution of one print order guarantee job and that of the next print order guarantee job.

If the print job management unit 402 determines in step S602 that the processing target print job cannot be executed, it may temporarily save the print job in the print job storage unit 403 without executing the processes in steps S603 to S605. In this case, the print job management unit 402 reads out the print job from the print job storage unit 403 upon completion of the execution of print order guarantee (all print order guarantee jobs), and causes the print processing unit 404 to execute it.

<Print Setting Determination Processing>

An example of the print setting determination processing in step S601 will be explained with reference to the flowchart shown in FIG. 7. In step S701, the print setting comparison unit 405 determines whether a sheet discharge destination designated by the print setting of a processing target print job (non-print order guarantee job) overlaps a discharge destination designated by the print setting of a print order guarantee job in progress. If the print setting comparison unit 405 determines that the discharge destinations overlap each other, it advances the process to step S702; if it determines that the discharge destinations do not overlap each other, to step S703.

In step S703, the print setting comparison unit 405 determines whether a sheet feed source designated by the print setting of the processing target print job overlaps a feed source designated by the print setting of the print order guarantee job in progress. If the print setting comparison unit 405 determines that the feed sources overlap each other, it advances the process to step S702; if it determines that the feed sources do not overlap each other, to step S704.

If the process advances from step S701 or S703 to step S702, the print setting comparison unit 405 generates determination information representing that the processing target print job cannot be executed during the execution of print order guarantee, and outputs it to the print job management unit 402. Accordingly, when at least one of the discharge destination and feed source designated by the print setting of the processing target print job overlaps the print setting of the print order guarantee job in progress, the print job management unit 402 determines that the print settings include a setting which disturbs output of a printed material by the print order guarantee. This is because an influence (to be described later) is exerted on a printed material output by the print order guarantee job.

In step S704, the print setting comparison unit 405 generates determination information representing that the processing target print job can be executed during the execution of print order guarantee, and outputs it to the print job management unit 402. This is because, when the discharge destination and feed source designated by the print settings of the processing target print job do not overlap the print settings of the print order guarantee job in progress, the influence (to be described later) is not exerted on a printed material output by the print order guarantee job.

Upon completion of the processing in step S702 or S704, the print setting comparison unit 405 ends the print setting determination processing. Although FIG. 7 shows a case in which the print setting determination processing is performed in the order of setting of the discharge destination and setting of the feed source (steps S701 and S703), these determination processes may be performed in the reverse order. Alternatively, only one of these determination processes may be performed.

As described above, the printing apparatus 101 according to the first embodiment compares the print setting of a print job (non-print order guarantee job) other than a print order guarantee job, which serves as a candidate of execution by interrupt processing during the execution of print order guarantee, with the print setting of a print order guarantee job in progress. As a result of the comparison, when the print setting of the non-print order guarantee job is a setting which does not disturb output of a printed material complying with the print settings of the print order guarantee job in progress, the printing apparatus 101 executes the non-print order guarantee job by interrupt processing without changing the print settings. More specifically, the printing apparatus 101 executes the processing target non-print order guarantee job (between two print order guarantee jobs) before the start of execution of the next print order guarantee job upon completion of the print order guarantee job in progress. Hence, the productivity of the printing apparatus can be increased by enabling a non-print order guarantee job to be executed during the execution of a print order guarantee job, for which the execution of print order guarantee is set, without disturbing the execution of this print order guarantee job.

When the print setting of the non-print order guarantee job is a setting which disturbs output of a printed material complying with the print settings of the print order guarantee job in progress, the printing apparatus 101 may display a warning screen and prompt the user to change the print setting of the non-print order guarantee job. Even in this case, the product (printed material) of the non-print order guarantee job can be output to a discharge destination reflecting the user's intention.

Application Example 1 of First Embodiment

The first application example of the first embodiment will be explained. As described above, when the printing apparatus 101 includes a plurality of sheet discharge units 205 as a plurality of discharge destinations, it can execute the following processing.

In the printing apparatus 101, the following problem may occur if interrupt processing for a non-print order guarantee job is performed during the execution of print order guarantee without applying the first embodiment. For example, when the same discharge destination is designated for the print setting of a print order guarantee job and that of a non-print order guarantee job, printed materials output by the respective jobs mix at the same discharge destination. As a result, a plurality of printed materials based on a plurality of print jobs (print order guarantee jobs) are output to the discharge destination in an output order inconsistent with a desired printing order upon the execution of print order guarantee.

According to the first embodiment, the execution of a non-print order guarantee job by interrupt processing is permitted only when it does not influence output of a printed material complying with the print settings of a print order guarantee job. While preventing a mixture of printed materials output by a print order guarantee job and non-print order guarantee job at the discharge destination, interruption by the non-print order guarantee job during the execution of print order guarantee becomes possible. This increases the productivity of the printing apparatus.

According to the first embodiment, for example, the warning screen shown in FIG. 8 may be displayed to prompt a change of the print setting (discharge destination) of a non-print order guarantee job so that the printed material can be output to a discharge destination different from that of a print order guarantee job. Even when a discharge destination designated by the print setting of a non-print order guarantee job overlaps that of a print order guarantee job, interruption by the non-print order guarantee job during the execution of print order guarantee can be performed without influencing the print order guarantee job. Also, the product of the non-print order guarantee job can be output to a discharge destination reflecting the user's intention.

Application Example 2 of First Embodiment

The second application example of the first embodiment will be explained. As described above, when the printing apparatus 101 includes a plurality of sheet feed units 203 and 204 as a plurality of feed sources (feed trays), it can execute the following processing. For example, a case in which the user has set in advance a predetermined number of sheets in the specific sheet feed unit 203 in consideration of the number of sheets to be used in a print order guarantee job will be considered.

In the printing apparatus 101, the following problem may occur if interrupt processing for a non-print order guarantee job is performed during the execution of print order guarantee without applying the first embodiment. For example, when the same feed source is designated for the print setting of a print order guarantee job and that of a non-print order guarantee job, printed materials not intended by the user may be output by the print order guarantee job. More specifically, when pre-printed sheets in a specific order have been set in the sheet feed unit 203 for a print order guarantee job, they may be used by executing the non-print order guarantee job by interrupt processing. As a result, the printing apparatus 101 cannot output a printed material complying with the print settings of the print order guarantee job as the user intended.

According to the first embodiment, the execution of a non-print order guarantee job by interrupt processing is permitted only when it does not influence output of a printed material complying with the print settings of a print order guarantee job. While preventing a non-print order guarantee job from using sheets set for a print order guarantee job, interruption by the non-print order guarantee job during the execution of print order guarantee becomes possible. This increases the productivity of the printing apparatus.

According to the first embodiment, for example, the warning screen shown in FIG. 8 may be displayed to prompt a change of the print setting (feed source) of a non-print order guarantee job so that sheets at a feed source different from that of a print order guarantee job can be used. Even when a feed source designated by the print setting of a non-print order guarantee job overlaps that of a print order guarantee job, interruption by the non-print order guarantee job during the execution of print order guarantee can be performed without influencing the print order guarantee job. In addition, a printed material by the non-print order guarantee job can be output by using sheets at a feed source reflecting the user's intention.

Second Embodiment

Figure 9:
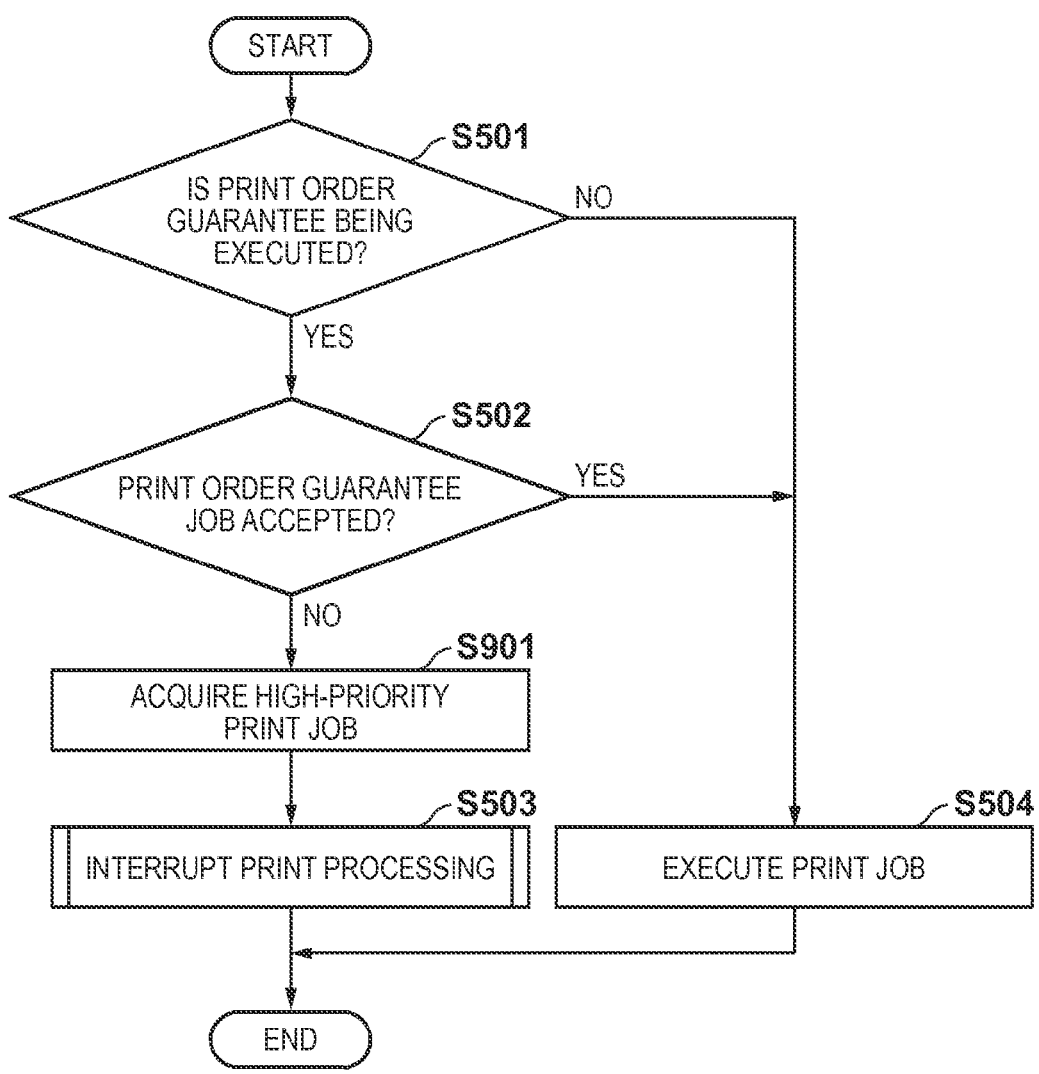
FIG. 9 is a flowchart showing the procedures of processing to be executed when a printing apparatus 101 accepts a print job according to the second embodiment.

The second embodiment of the present invention will be explained with reference to FIG. 9. FIG. 9 is a flowchart showing the procedures of processing to be executed when a printing apparatus 101 accepts a print job according to the second embodiment. The second embodiment is the same as the first embodiment (FIG. 5) except that step S901 is added.

In the second embodiment, a print job management unit 402 executes processing in step S901 before advancing the process from step S502 to step S503. More specifically, when the print job management unit 402 newly accepts a print job (non-print order guarantee job) other than a print order guarantee job during the execution of print order guarantee, it temporarily saves the print job in a print job storage unit 403. In step S901, if a plurality of non-print order guarantee jobs are saved in the print job storage unit 403, the print job management unit 402 compares priorities set for the respective jobs, and executes processing in step S503 for the respective jobs in descending order of the priority. That is, the print job management unit 402 executes the above-described determination processing (step S601) for a plurality of already accepted non-print order guarantee jobs in accordance with the set priorities, and executes the jobs by interrupt printing based on the determination result.

In this fashion, the printing apparatus 101 according to the second embodiment can preferentially execute a high-priority job by interrupt processing even in a state in which a plurality of non-print order guarantee jobs wait for execution during the execution of print order guarantee. In the first embodiment, the printing apparatus 101 executes non-print order guarantee jobs in the acceptance order (in which reception was completed). To the contrary, according to the second embodiment, a job (non-print order guarantee job) having a temporal restriction, such as a schedule print job, can be executed preferentially by interruption, and processing reflecting the user's intention more faithfully can be performed.

Third Embodiment

Figure 10:
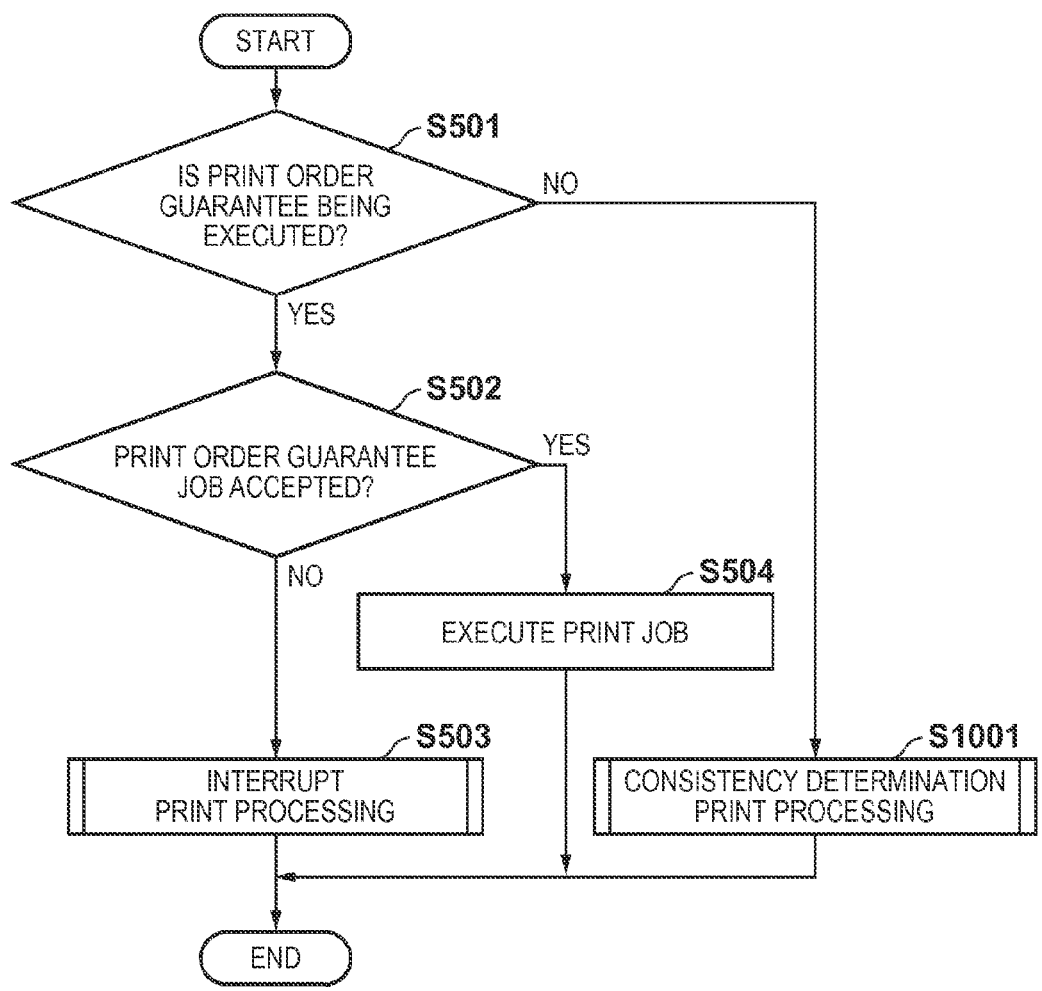
FIG. 10 is a flowchart showing the procedures of processing to be executed when a printing apparatus 101 accepts a print job according to the third embodiment.

The third embodiment of the present invention will be described with reference to FIGS. 10 to 13. FIG. 10 is a flowchart showing the procedures of processing to be executed when a printing apparatus 101 accepts a print job according to the third embodiment. The third embodiment is the same as the first embodiment (FIG. 5) except that, if the print order guarantee is determined not to be in execution in determination processing of step S501 upon reception of a print job via a print job reception unit 401, the process advances not to step S504 but to step S1001.

In step S1001, a print job management unit 402 executes consistency determination processing for a printed material (product) present at a discharge destination designated by the print setting of a processing target print job that has been accepted in step S501, and controls the execution of the print job in accordance with the determination result.

<Consistency Determination Print Processing>

Figure 11:
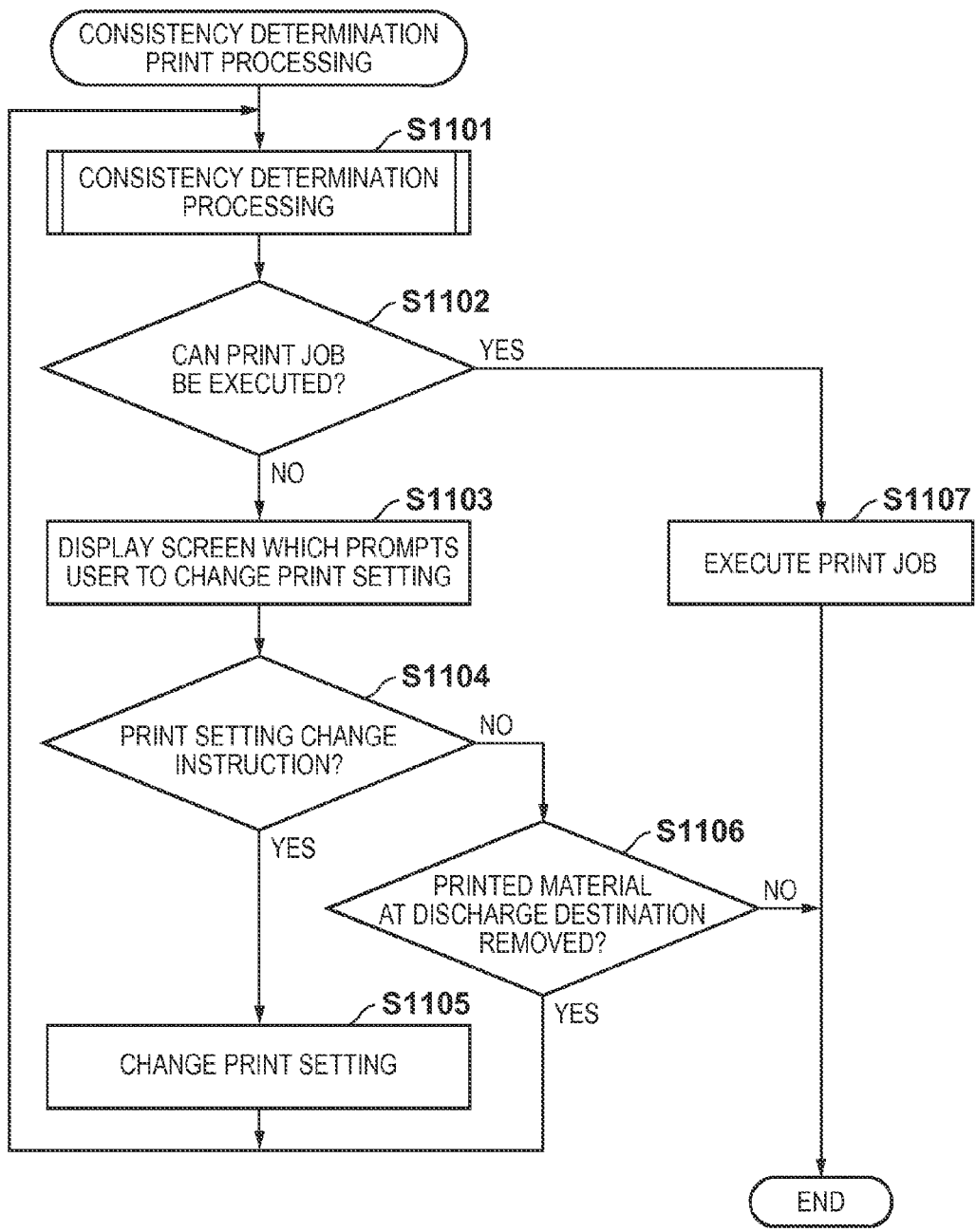
FIG. 11 is a flowchart showing details of the procedures of consistency determination print processing (step S1001) according to the third embodiment.

FIG. 11 is a flowchart showing details of the procedures of consistency determination print processing (step S1001) according to the third embodiment. In accordance with the use status of a discharge destination designated by the print setting of a processing target print job, the print job management unit 402 executes the print job without changing the discharge destination, displays a warning screen, or changes the print setting of the print job.

In step S1101, the print job management unit 402 instructs a print setting comparison unit 405 about the execution of consistency determination processing of determining whether executing a processing target (candidate) print job will influence the consistency of an already output printed material or a printed material to be output. If the print job management unit 402 receives determination information representing the result of the determination processing from the print setting comparison unit 405, it advances the process to step S1102. Note that details of the determination processing in step S1101 will be explained with reference to FIG. 12.

In step S1102, the print job management unit 402 determines, based on the determination information obtained from the print setting comparison unit 405, whether the processing target print job can be executed. If the determination information indicates chance of consistency loss of a printed material (product) by a print order guarantee job, the print job management unit 402 determines that the print job cannot be executed, and advances the process to step S1103. If there is no chance of consistency loss of a printed material by a print order guarantee job, the print job management unit 402 determines that the print job can be executed, and advances the process to step S1107.

Figure 13:
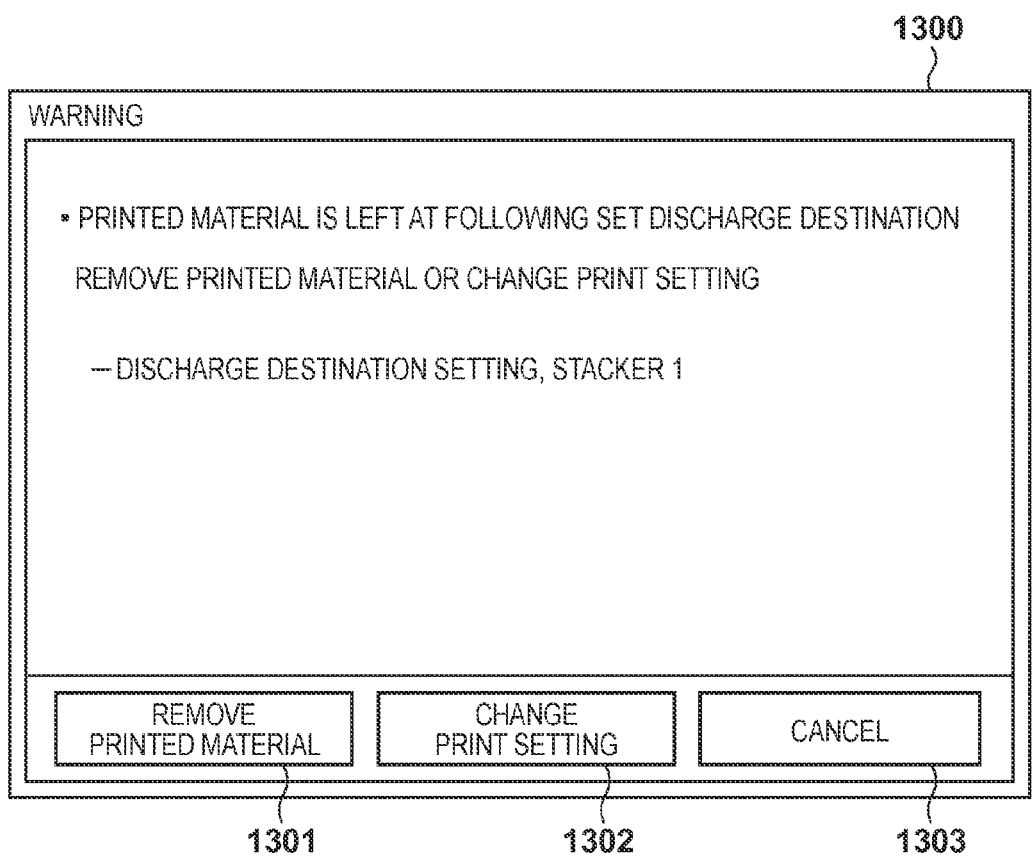
FIG. 13 is a view exemplifying a warning screen displayed on an operation unit 201 in step S1103 according to the third embodiment.

In step S1103, the print job management unit 402 instructs a UI control unit 406 about display of a warning screen (warning UI) as shown in FIG. 13 on the display unit of an operation unit 201. In accordance with this instruction, the UI control unit 406 displays the warning screen on the display unit of the operation unit 201. FIG. 13 exemplifies the warning screen displayed on the display unit by the UI control unit 406 in step S1103. The user selects, via a displayed warning screen 1300, to remove a printed material left at a displayed discharge destination (1301), to change the print setting of a processing target print job (1302), or to cancel the execution of a print job (1303). The UI control unit 406 transfers, to the print job management unit 402, the user instruction input via the operation unit 201.

In step S1104, the print job management unit 402 determines, based on the information from the UI control unit 406, whether a user change instruction to change the print setting of the processing target print job has been accepted via the operation unit 201. If the print job management unit 402 determines that the change instruction has been accepted (if the button 1302 has been operated), it advances the process to step S1105; if NO, to step S1106. In step S1105, the print job management unit 402 changes the print setting of the processing target print job in accordance with a user instruction further input via the operation unit 201. Then, the print job management unit 402 returns the process to step S1101 to repeat the above-described processing.

In step S1106, the print job management unit 402 determines whether a user instruction to remove a printed material left at the discharge destination has been accepted via the operation unit 201. If the print job management unit 402 determines that the instruction has been accepted (if the button 1301 has been operated), it returns the process to step S1101 to repeat the same processing as the above-described one. Meanwhile, the user can remove the printed material left at the discharge destination.

If the print job management unit 402 determines in step S1106 that the above instruction has not been accepted (if the cancel button 1302 has been operated), it ends the process without executing the processing target job. This is because, if the processing target print job is executed while a printed material by a print order guarantee job remains at the discharge destination, the consistency of the printed material may be lost. If the print job is a print order guarantee job, the consistency of a printed material by this print order guarantee job may be lost owing to the printed material present at the discharge destination. Note that an unexecuted print job may be temporarily saved in a print job storage unit 403. In this case, the execution of the print job can be tried again in accordance with an execution instruction by the user.

<Consistency Determination Processing>

Figure 12:
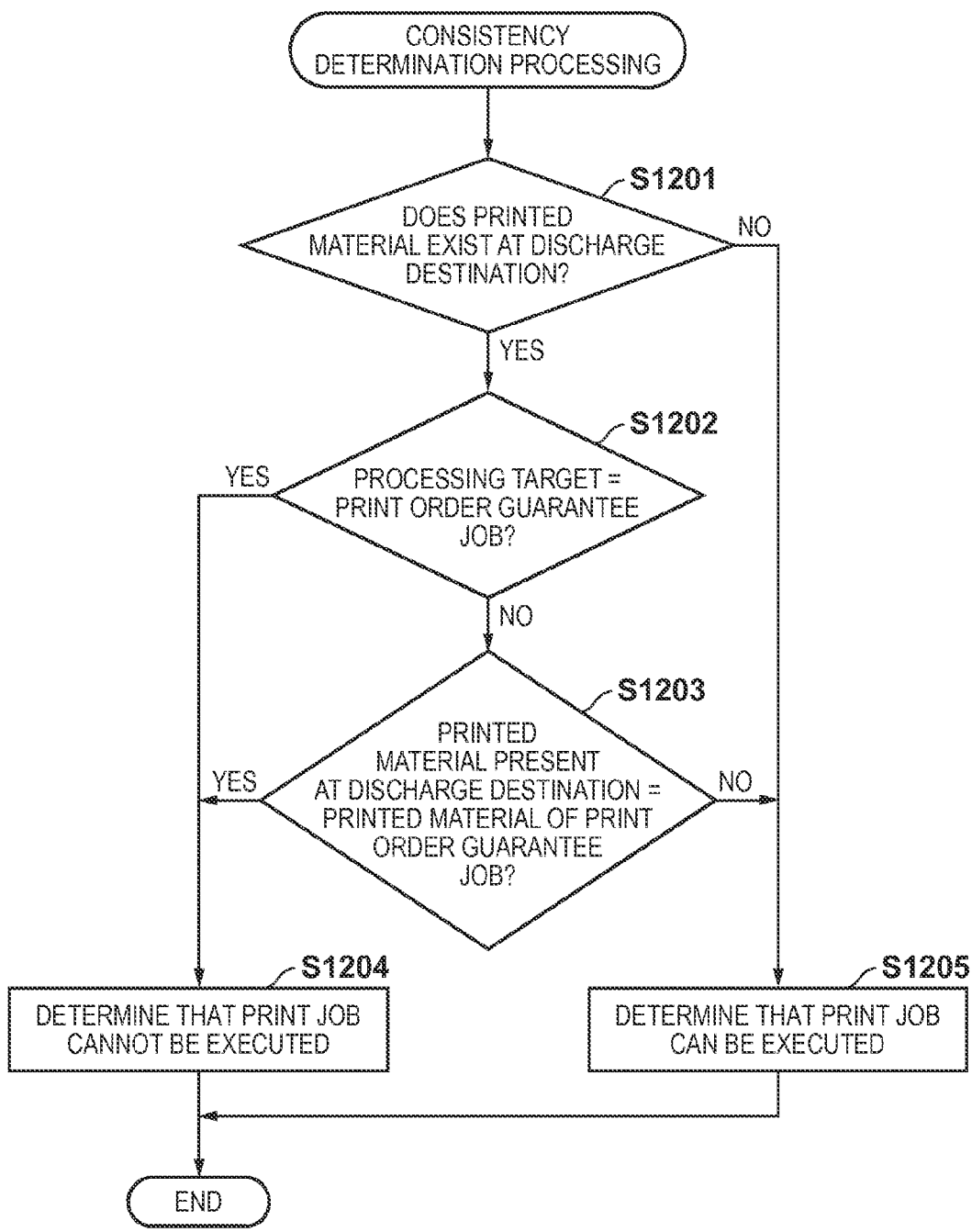
FIG. 12 is a flowchart showing details of the procedures of consistency determination processing (step S1101) according to the third embodiment.

FIG. 12 is a flowchart showing details of the procedures of the consistency determination processing (step S1101). In step S1201, the print setting comparison unit 405 determines, based on information obtained from a device information acquisition unit 407, whether a printed material currently remains at a discharge destination designated by the print setting of a processing target. If the print setting comparison unit 405 determines that a printed material is present, it advances the process to step S1202; if it determines that no printed material is present, to step S1205.

In step S1205, the print setting comparison unit 405 generates determination information representing that the processing target print job can be executed, outputs it to the print job management unit 402, and then ends the process. This is because, when no printed material is present at the discharge destination, the consistency of a printed material by a print order guarantee job is not influenced.

In step S1202, the print setting comparison unit 405 determines whether the processing target print job is a print order guarantee job. At this time, the print setting comparison unit 405 executes the determination processing by confirming whether the execution of print order guarantee is set in the print setting of the print job obtained from the print job storage unit 403 via the print job management unit 402. If the print setting comparison unit 405 determines that the processing target print job is a print order guarantee job, it advances the process to step S1204, generates determination information representing that the print job cannot be executed, outputs it to the print job management unit 402, and then ends the process.

As a result, in steps S1102 to S1106, the print job management unit 402 determines that the processing target print job cannot be executed, and inhibits the execution of the print job until the printed material present at the discharge destination is removed. This is because, if the print order guarantee job is executed while a printed material by another job remains at the discharge destination, the printed material by the other job and a printed material output by the execution of the print order guarantee job mix at the discharge destination. That is, the consistency of the printed material output by the print order guarantee job is lost. In such a case, according to the third embodiment, the execution of the print job is inhibited, preventing consistency of the printed material by the print order guarantee job from being lost.

If the print setting comparison unit 405 determines in step S1202 that the processing target print job is not a print order guarantee job, it advances the process to step S1203. In step S1203, the print setting comparison unit 405 determines, based on the information obtained from a device information acquisition unit 407, whether the printed material left at the discharge destination designated by the print setting of the processing target print job is a printed material by a print order guarantee job. If the print setting comparison unit 405 determines as a result of the determination processing that the printed material left at the discharge destination is not a printed material by a print order guarantee job, it advances the process to step S1205.

In step S1205, the print setting comparison unit 405 generates determination information representing that the processing target print job can be executed, outputs it to the print job management unit 402, and then ends the process. This is because, if the printed material present at the discharge destination is not a printed material by a print order guarantee job, the consistency of the printed material by the print order guarantee job need not be considered.

If the print setting comparison unit 405 determines in step S1202 that the printed material present at the discharge destination is a printed material by a print order guarantee job, it advances the process to step S1204. In step S1204, the print setting comparison unit 405 generates determination information representing that the print job cannot be executed, outputs it to the print job management unit 402, and then ends the process.

As a result, in steps S1102 to S1106, the print job management unit 402 determines that the processing target print job cannot be executed, and inhibits the execution of the print job until the printed material present at the discharge destination is removed. This is because, if the print job (non-print order guarantee job) is executed while a printed material by a print order guarantee job remains at the discharge destination, the printed material by the print job is output on the printed material by the print order guarantee job. That is, the consistency of the printed material already output by the print order guarantee job is lost. In such a case, according to the third embodiment, the execution of the print job is inhibited, preventing consistency of the printed material by the print order guarantee job from being lost.

When the execution of a processing target print job is inhibited, if a discharge destination designated by the print setting of the print job is changed to a different one as in steps S1104 and S1105, the print job management unit 402 cancels the inhibition of the execution of the print job. In the third embodiment, if the process returns from step S1105 to step S1101 and it is determined in steps S1101 and S1102 that a print job can be executed, the inhibition of the execution of the print job is canceled.

As described above, the printing apparatus 101 according to the third embodiment determines whether the consistency of a printed material by a print order guarantee job is maintained not only during the execution of print order guarantee but also in a period (before the start or after the end of a print order guarantee job) in which the print order guarantee is not executed. According to the third embodiment, the consistency of a printed material by a print order guarantee job can be maintained even in a period in which the print order guarantee is not executed.

Fourth Embodiment

Figure 14:
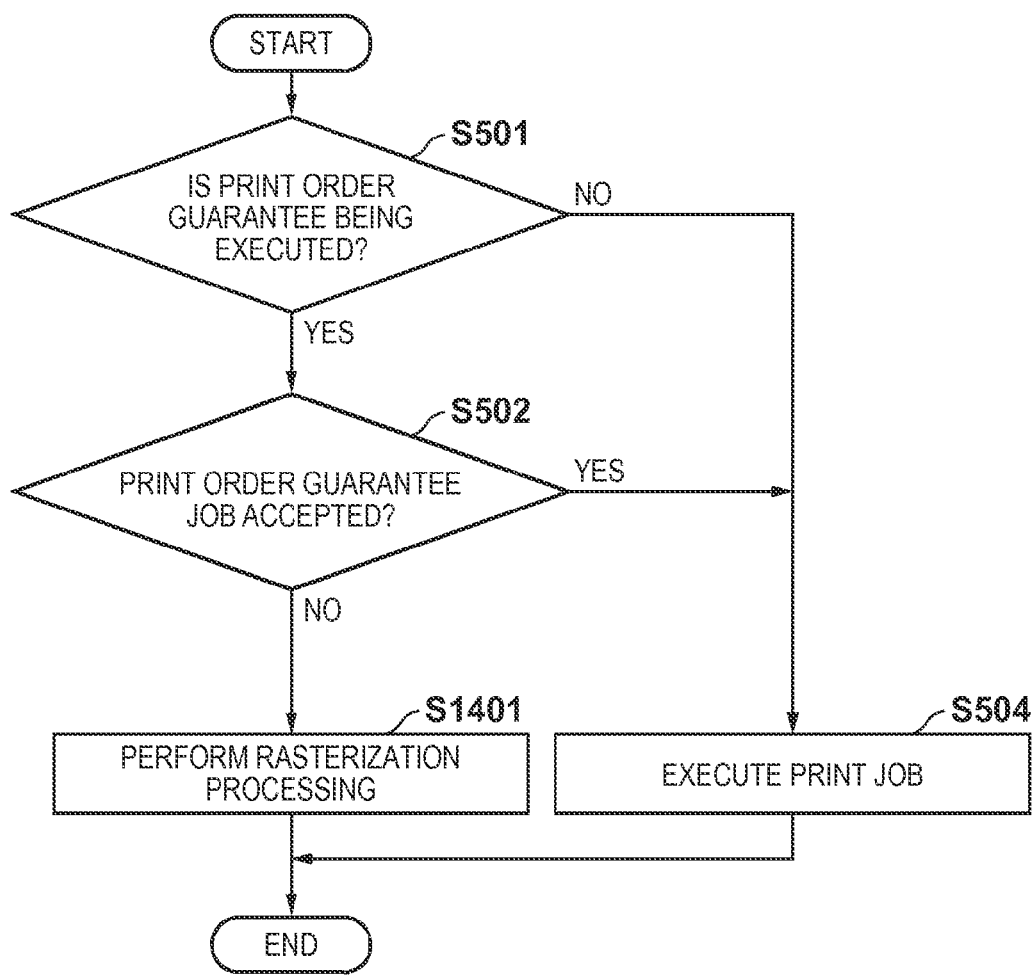
FIG. 14 is a flowchart showing the procedures of processing to be executed when a printing apparatus 101 accepts a print job according to the fourth embodiment.

The fourth embodiment of the present invention will be described with reference to FIG. 14. FIG. 14 is a flowchart showing the procedures of processing to be executed when a printing apparatus 101 accepts a print job according to the fourth embodiment. The fourth embodiment is the same as the first embodiment (FIG. 5) except that, if it is determined in step S502 that an accepted print job is not a print order guarantee job, the process advances not to step S503 but to step S1401.

In the fourth embodiment, when a print job received via a print job reception unit 401 is a print order guarantee job, a print job management unit 402 executes only rasterization processing for the print job in step S1401 without executing the print job by interrupt processing. Further, the print job management unit 402 temporarily saves the print job having undergone the rasterization processing in a print job storage unit 403, and ends the process. The print job is executed after the end of print order guarantee.

In the first embodiment, only when a processing target print job does not include a setting which disturbs output of a printed material complying with the print settings of a print order guarantee job in progress, the print job is executed by interrupt processing by using an idle time during the execution of print order guarantee. However, for example, when many print order guarantee jobs have already been waiting for execution and the waiting print order guarantee jobs are to be preferentially executed, the timing to execute a newly accepted print job (non-print order guarantee job) may be greatly delayed. In such a case, according to the fourth embodiment, rasterization processing for the non-print order guarantee job is executed by using the idle time of rasterization processing for the print order guarantee jobs.

Even when a non-print order guarantee job cannot be executed in a state in which many print order guarantee jobs have already been waiting, the process for the job can be progressed. After the end of print order guarantee, the non-print order guarantee job can be executed in a short time, increasing the productivity of the printing apparatus.

Fifth Embodiment

Figure 15:
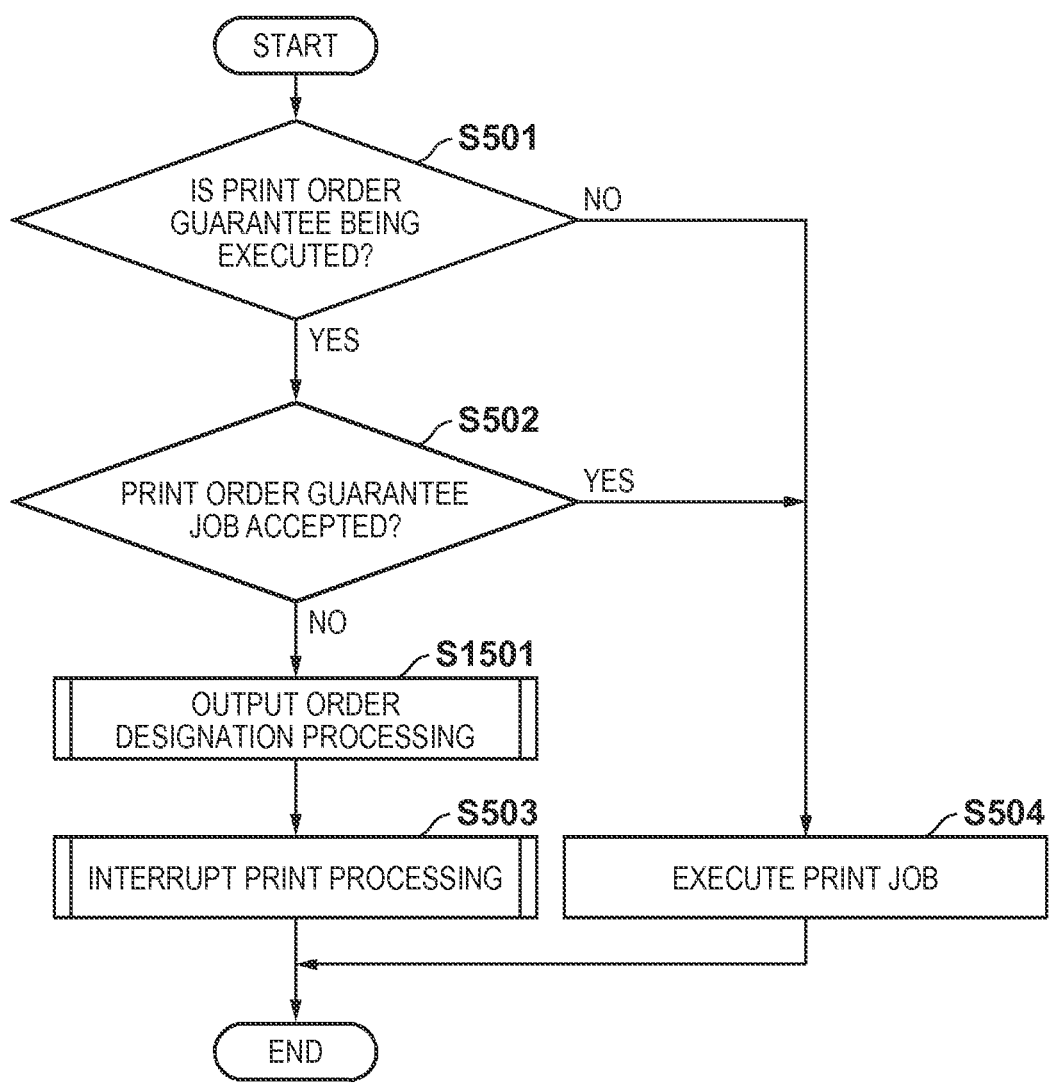
FIG. 15 is a flowchart showing the procedures of processing to be executed when a printing apparatus 101 accepts a print job according to the fifth embodiment.
Figure 16:
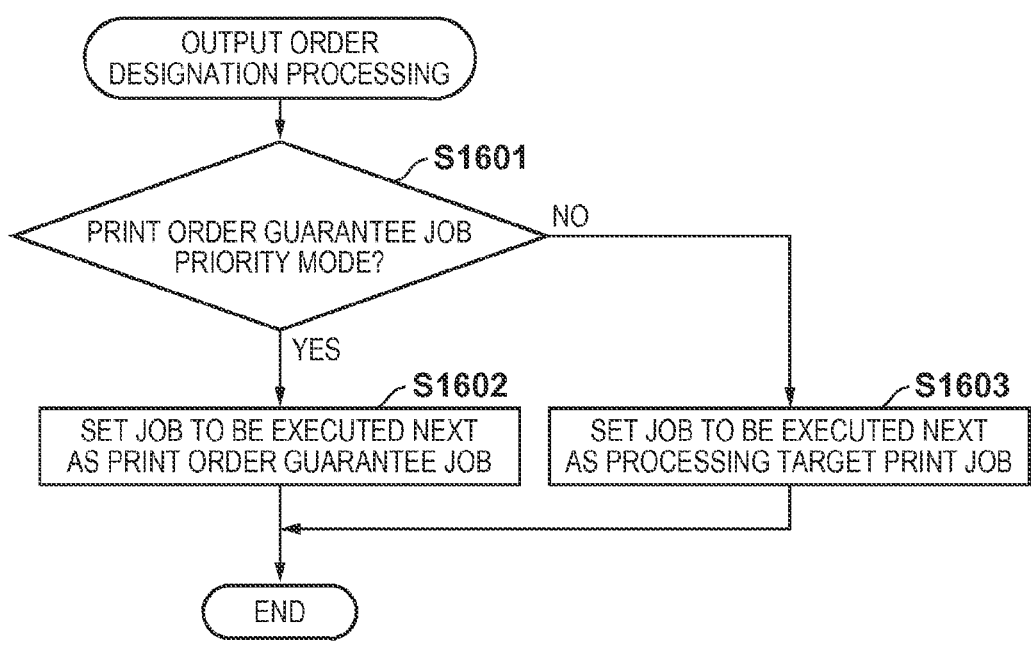
FIG. 16 is a flowchart showing details of the procedures of output order designation processing (step S1501) according to the fifth embodiment.
Figure 17:
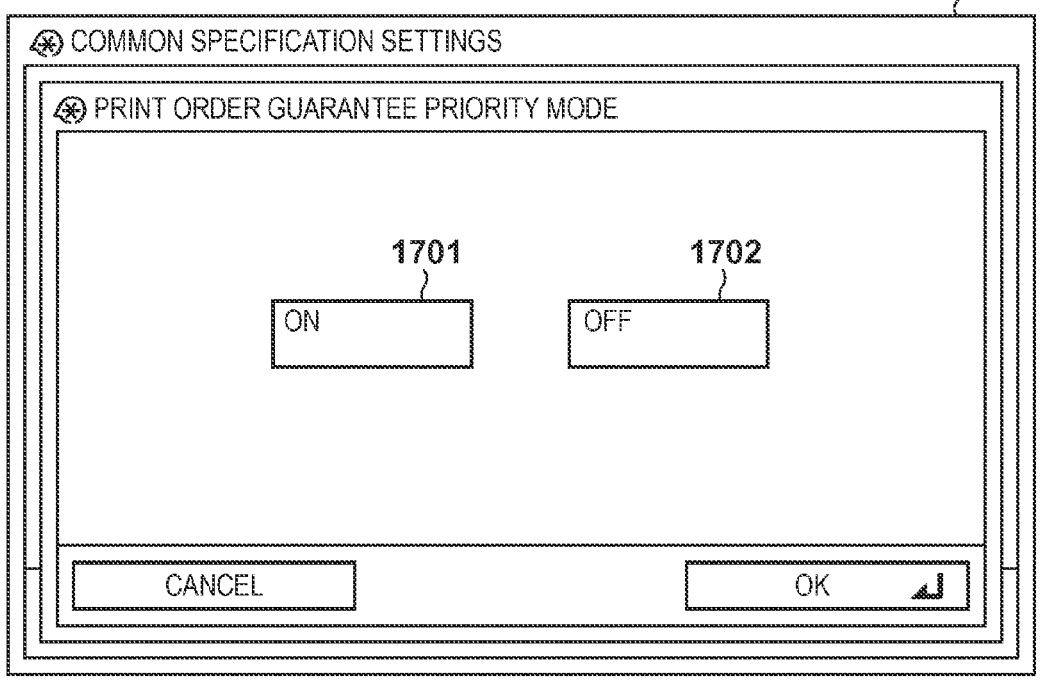
FIG. 17 is a view exemplifying a setting screen for setting a print order guarantee priority mode according to the fifth embodiment.

The fifth embodiment of the present invention will be described with reference to FIGS. 15 to 17. FIG. 15 is a flowchart showing the procedures of processing to be executed when a printing apparatus 101 accepts a print job according to the fifth embodiment. The fifth embodiment is the same as the first embodiment (FIG. 5) except that, if it is determined in step S502 that an accepted print job is not a print order guarantee job, the process advances to step S503 via step S1501.

If a print order guarantee job and non-print order guarantee job shift to the execution standby state at the same time during the execution of print order guarantee, the job of preference is considered to be different depending on the user. Considering this, according to the fifth embodiment, the printing apparatus 101 allows the user to set his or her job of preference.

More specifically, a print job management unit 402 instructs a UI control unit 406 to display, on the display unit of an operation unit 201, a setting screen for setting, in accordance with a user operation, which of a print order guarantee job and non-print order guarantee job is preferentially executed. FIG. 17 exemplifies the setting screen for setting a print order guarantee priority mode. The user may operate a button 1701 via a displayed setting screen 1700 to give priority to a print order guarantee job, and a button 1702 to give priority to a non-print order guarantee job. The UI control unit 406 transfers, to the print job management unit 402, the user instruction input via the operation unit 201. Based on the information transferred from the UI control unit 406, the print job management unit 402 sets in advance which of a print order guarantee job and non-print order guarantee job is preferentially executed.

Referring back to FIG. 15, if the print order guarantee is being executed ("YES" in step S501) upon accepting a print job, and the accepted print job is a non-print order guarantee job ("NO" in step S502), the print job management unit 402 advances the process to step S1501. In step S1501, if a print order guarantee job has already been waiting for execution by the print order guarantee, the print job management unit 402 controls the execution order of the print order guarantee job and the newly accepted non-print order guarantee job. More specifically, the print job management unit 402 executes output order designation processing in accordance with procedures shown in FIG. 16.

In step S1601, the print job management unit 402 determines, based on contents set in advance via the setting screen 1700, whether a mode in which priority is given to a print order guarantee job has been set. If the print job management unit 402 determines that the mode in which priority is given to a print order guarantee job is set, it advances the process to step S1602, and sets a job to be executed next as a print order guarantee job. If the print job management unit 402 determines that the mode in which priority is given to a print order guarantee job is not set, it sets a job to be executed next as a processing target print job (non-print order guarantee job).

According to the fifth embodiment, even when many non-print order guarantee jobs shift to the standby state during the execution of print order guarantee, the job execution order can be controlled so that a non-print order guarantee job is preferentially executed.

Sixth Embodiment

Figure 18:
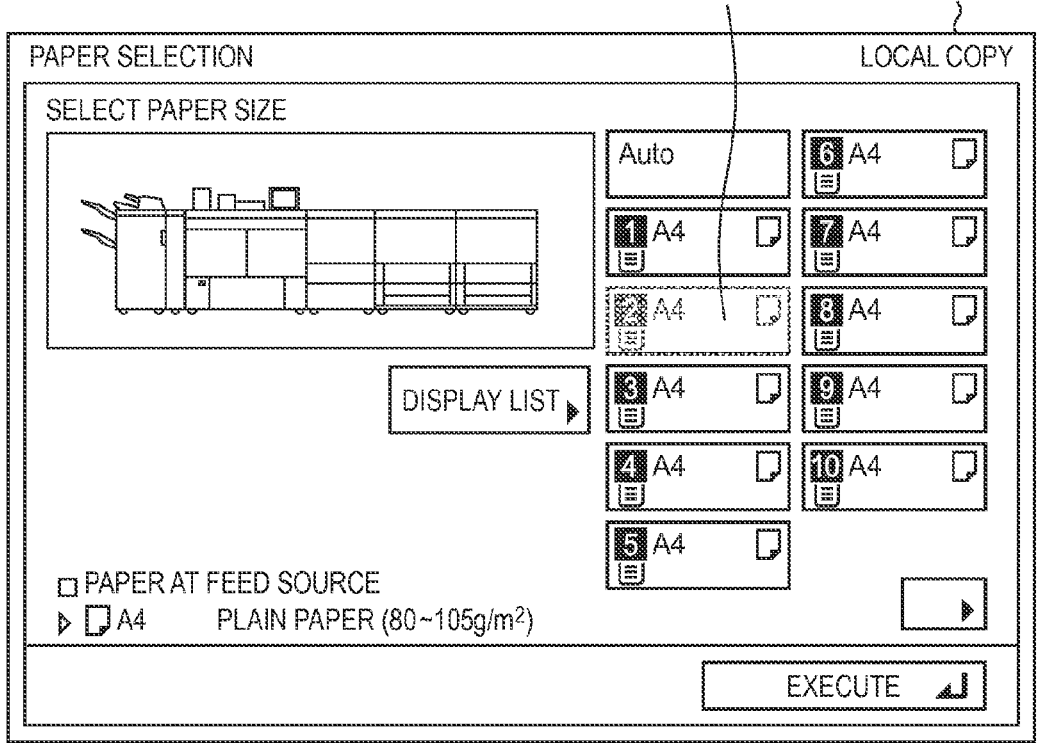
FIG. 18 is a view exemplifying a prohibition processing-applied setting screen according to the sixth embodiment.

The sixth embodiment of the present invention will be described with reference to FIG. 18. A difference from the above-described embodiments will be mainly explained. A printing apparatus 101 can execute not only a print job transmitted from a client PC 102 but also, for example, a job set by using an operation unit 201 of the printing apparatus 101. However, when such a job is newly set, the newly set job may disturb output of a printed material complying with the print settings of a print order guarantee job in progress, similar to the above-described embodiments.

In the sixth embodiment, when the user sets a job and inputs an execution instruction via the operation unit 201 during the execution of print order guarantee, the printing apparatus 101 controls display of the setting screen not to allow a setting which disturbs output of a printed material by a print order guarantee job.

A print job management unit 402 instructs a UI control unit 406 to display a job setting screen on the display unit of the operation unit 201 in accordance with a user operation. FIG. 18 exemplifies a prohibition processing-applied setting screen for making settings for a copy job. When the print order guarantee is being executed, the print job management unit 402 applies prohibition processing to a setting screen 1800 displayed on the display unit, not to allow a setting which disturbs output of a printed material complying with the print settings of a print order guarantee job.

For example, when displaying the setting screen 1800 for making settings for a copy job during the execution of print order guarantee, the print job management unit 402 performs the following control. More specifically, the print job management unit 402 controls display of the setting screen 1800 so that at least either of the settings of the discharge destination and feed source of sheets for the copy job does not become the same as the print setting of a job in progress by the print order guarantee. This control can be executed by graying out a button (for example, a button 1801) corresponding to a setting to be prohibited, as shown in FIG. 18.

In the sixth embodiment, even for a print job such as a copy job set in the main body of the printing apparatus 101, it is prohibited to make a setting which disturbs output of a printed material by a print order guarantee job at the stage of print setting. Even in this case, according to the sixth embodiment, output of a printed material by a print order guarantee job can be prevented from being disturbed.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-207527, filed Sep. 20, 2012, which is hereby incorporated by reference herein in its entirety.

What is claimed is:

1. A printing apparatus comprising:
a determining unit configured to determine, in a case where another type of job other than a specific type of job is received before a predetermined time has elapsed after the specific type of job is received, whether a discharging destination of the another type of job is the same as a discharging destination of the specific type of job;

a restricting unit configured to restrict, in a case where the determining unit determines that the discharging destination of the another type of job is the same as the discharging destination of the specific type of job, execution of the another type of job between the specific type of job and a next specific type of job received before the predetermined time has elapsed; and an executing unit configured to execute, in a case where the determining unit determines that the discharging destination of the another type of job is not the same as the discharging destination of the specific type of job, the another type of job between the specific type of job and the next specific type of job received before the predetermined time has elapsed.

2. The printing apparatus according to claim 1, further comprising a notification unit configured to notify a user of a factor of the restriction by the restricting unit in a case where the restricting unit restricts the execution of the another type of the job.

3. The printing apparatus according to claim 2, wherein the factor of the restriction includes the discharging destination of the another type of job.

4. The printing apparatus according to claim 1, further comprising a changing unit configured to change, based on an instruction received from a user, the discharging destination of the another type of job in a case where the restricting unit restricts the execution of the another type of the job.

5. The printing apparatus according to claim 1, wherein the specific type of job is a job for which guarantee of a print order is set.

6. A control method for controlling a printing apparatus comprising:

determining, in a case where another type of job other than the specific type of job is received before a predetermined time has elapsed after a specific type of job is received, whether a discharging destination of the another type of job is the same as a discharging destination of the specific type of job;

restricting, in a case where it is determined that the discharging destination of the another type of job is the same as the discharging destination of the specific type of job, execution of the another type of job between the specific type of job and a next specific type of job received before the predetermined time has elapsed; and executing, in a case where it is determined that the discharging destination of the another type of job is not the same as the discharging destination of the specific type of job, the another type of job between the specific type of job and the next specific type of job received before the predetermined time has elapsed.

7. A non-transitory computer readable storage medium for storing a computer program for controlling a printing apparatus, comprising:

a code to determine, in a case where another type of job other than the specific type of job is received before a predetermined time has elapsed after a specific type of job is received, whether a discharging destination of the another type of job is the same as a discharging destination of the specific type of job;

a code to restrict, in a case where it is determined that the discharging destination of the another type of job is the same as the discharging destination of the specific type of job, execution of the another type of job between the specific type of job and a next specific type of job received before the predetermined time has elapsed; and a code to execute, in a case where it is determined that the discharging destination of the another type of job is not the same as the discharging destination of the specific type of job, the another type of job between the specific type of job and the next specific type of job received before the predetermined time has elapsed.

* * * * *